(12) United States Patent
Bourgault et al.

(10) Patent No.: US 11,346,438 B2
(45) Date of Patent: May 31, 2022

(54) GREASABLE IDLER PULLEY AND RELATED KIT AND METHOD

(71) Applicant: F.P. BOURGAULT TILLAGE TOOLS LTD., St. Brieux (CA)

(72) Inventors: Joseph L. Bourgault, St. Brieux (CA); Frank Nagy, St. Brieux (CA); Roberto P. Soriano, Melfort (CA); Dean M. Bigelow, St. Brieux (CA); Dylan Chadwick Noble Theis, St. Brieux (CA)

(73) Assignee: F.P. BOURGAULT TILLAGE TOOLS LTD., St. Brieux (CA)

( * ) Notice: Subject to any disclaimer, the term of this patent is extended or adjusted under 35 U.S.C. 154(b) by 524 days.

(21) Appl. No.: 16/280,345

(22) Filed: Feb. 20, 2019

(65) Prior Publication Data

US 2019/0257409 A1 Aug. 22, 2019

Related U.S. Application Data

(60) Provisional application No. 62/632,801, filed on Feb. 20, 2018.

(51) Int. Cl.
*F16H 55/30* (2006.01)
*F16N 21/02* (2006.01)
(Continued)

(52) U.S. Cl.
CPC ......... *F16H 57/0464* (2013.01); *F16C 19/26* (2013.01); *F16C 33/6607* (2013.01);
(Continued)

(58) Field of Classification Search
CPC ...... F16H 57/0464; F16H 55/30; F16H 55/36; F16H 57/0471; F16C 19/26;
(Continued)

(56) References Cited

U.S. PATENT DOCUMENTS 1,927,534 A 9/1933 Wooler
2,039,875 A 5/1936 Benson
(Continued)

FOREIGN PATENT DOCUMENTS

BR MU8801649 U2 10/2010
CN 2926746 Y 7/2007
CN 102927425 2/2013

OTHER PUBLICATIONS

Written Opinion and International Search Report, issued from the Canadian Intellectual Property Office, in corresponding International Application No. PCT/CA2019/050201, dated Apr. 26, 2019 (9 pages).

*Primary Examiner* — Gene O Crawford
*Assistant Examiner* — Emily Rose Kincaid
(74) *Attorney, Agent, or Firm* — Finnegan, Henderson, Farabow, Garrett & Dunner, L.L.P.

(57) ABSTRACT

Greasable idler pulleys and related kits and methods are disclosed. The greasable idler pulley has a rotating body, a bearing, to enable the rotating body to rotate with respect to a shaft, and grease fitting defined through the rotating body. The rotating body may have a bearing seal cap having an orifice and a rotator. The grease fitting may be in fluid communication with the bearing through the orifice in the bearing seal cap. Kits are also contemplated, such as a kit for retrofitting a non-regreasable idler pulley including a rotator to a regreasable idler pulley. Methods may include methods of producing a regreasable idler pulley from a non-regreasable idler pulley.

20 Claims, 14 Drawing Sheets

(51) Int. Cl.
    *F16C 33/76* (2006.01)
    *F16C 19/26* (2006.01)
    *F16H 57/04* (2010.01)
    *F16H 55/36* (2006.01)
    *F16C 33/66* (2006.01)

(52) U.S. Cl.
    CPC .......... *F16C 33/6618* (2013.01); *F16C 33/76* (2013.01); *F16H 55/30* (2013.01); *F16H 55/36* (2013.01); *F16H 57/0471* (2013.01); *F16N 21/02* (2013.01); *F16C 2361/63* (2013.01); *F16N 2210/14* (2013.01); *F16N 2280/00* (2013.01)

(58) Field of Classification Search
    CPC .. F16C 33/6607; F16C 33/6618; F16C 33/76; F16C 2361/63; F16N 21/02; F16N 2210/14; F16N 2280/00
    USPC .................................................. 474/90; 184/5
    See application file for complete search history.

(56) References Cited

U.S. PATENT DOCUMENTS

| | | | |
|---|---|---|---|
| 2,204,084 A | 6/1940 | Hughes | |
| 2,459,290 A | 1/1949 | Rozner | |
| 2,728,240 A | 12/1955 | Stahlecker | |
| 2,979,368 A | 4/1961 | Steichele | |
| 3,804,476 A * | 4/1974 | Nakamura | F16C 33/6674 384/469 |
| 3,899,226 A * | 8/1975 | Frost | F16C 13/006 384/480 |
| 3,903,992 A | 9/1975 | Chivukula et al. | |
| 4,240,677 A | 12/1980 | Payne et al. | |
| 4,364,614 A * | 12/1982 | Weis | F16C 33/723 384/489 |
| 4,408,808 A | 10/1983 | Redmann et al. | |
| 4,838,841 A | 6/1989 | Harvey | |
| 4,928,794 A * | 5/1990 | Bangerger | F16C 33/6622 184/5.1 |
| 5,725,448 A | 3/1998 | Kato et al. | |
| 6,325,545 B1 | 12/2001 | Stangl et al. | |
| 6,659,228 B2 * | 12/2003 | Wolf | F16C 33/6607 184/12 |
| 6,854,893 B2 | 2/2005 | Schmidt | |
| 7,614,611 B1 * | 11/2009 | Walton | F16H 55/36 254/393 |
| 8,881,884 B2 | 11/2014 | Kaminski | |
| 2002/0086754 A1* | 7/2002 | Fukuwaka | F16C 33/416 474/199 |
| 2003/0039422 A1* | 2/2003 | Nisley | F16C 33/805 384/477 |
| 2004/0005102 A1 | 1/2004 | Schmidt et al. | |
| 2004/0220006 A1 | 11/2004 | Denis | |
| 2004/0247217 A1* | 12/2004 | Konruff | F16C 25/06 384/583 |
| 2009/0291791 A1* | 11/2009 | Ward | F16H 7/20 474/112 |
| 2013/0331215 A1* | 12/2013 | Hewitt | F16H 55/44 474/174 |
| 2014/0169709 A1* | 6/2014 | Deckard | F16C 35/042 384/147 |
| 2015/0145167 A1* | 5/2015 | Swane | F16C 13/006 264/259 |
| 2016/0040721 A1* | 2/2016 | Kice | F16J 15/54 384/480 |

* cited by examiner

GREASABLE IDLER PULLEY AND RELATED KIT AND METHOD

CROSS-REFERENCE TO RELATED APPLICATIONS

The present application claims priority from U.S. Patent Application Ser. No. 62/632,801, entitled "Greasable Idler Pulley and Related Kit and Method", filed on Feb. 20, 2018, which is incorporated herein by reference.

FIELD

The disclosure generally relates to an idler pulley, and in particular to a greasable idler pulley and related kit and method.

BACKGROUND

An idler pulley, also sometimes referred to as a guide pulley, is an apparatus that rotates with respect to a shaft and presses against a belt or chain to guide or tighten it.

Virtually all machines using idler pulleys employ idler pulleys with a bearing that is not regreasable (hereinafter a "non-regreasable idler pulley"). That is to say, once the non-regreasable idler pulley is assembled no additional grease can be added to its bearing.

Advantages of the non-regreasable idler pulley include the fact that they have seals which prevent dust from getting into the bearings and that they are relatively easy to maintain, that is to say, no greasing is required to be added with a non-regreasable idler pulley. But this is useful only up to the point where the bearing fails. Bearing failure in non-regreasable idler pulleys can result, for example, from the breakdown of the grease in the bearing, and requires that the entire non-regreasable idler pulley be replaced with a new one. This can be very costly in most instances in loss or downtime and mechanical repair expenses.

SUMMARY

According to one aspect of the disclosure there is provided an idler pulley, comprising: a rotating body comprising: a bearing seal cap having an orifice; and a rotator; a bearing to enable the rotating body to rotate with respect to a shaft; and a grease fitting defined through the rotating body and in fluid communication with the bearing through the orifice in the bearing seal cap. The rotator may be pulley and/or a sprocket.

The bearing may comprise an inner race, and the bearing seal cap may be adapted to seal against both the shaft and the inner race. In an aspect, the bearing seal cap is biased against the shaft by a spring retainer.

The rotating body may include a bearing cover. The bearing seal cap may be disposed between the bearing cover and the bearing, and the bearing may be disposed between the bearing seal cap and the rotator. In an aspect, the grease fitting is further defined through the bearing cover. In an aspect, the bearing cover is coupled to the rotator with a quick change fastener. The bearing cover may be integral with the rotator.

According to an aspect of the disclosure, the grease fitting may be radially displaced from an axis of rotation of the rotating body.

According to another aspect of the disclosure, there is provided a kit for retrofitting a non-regreasable idler pulley comprising a rotator to a regreasable idler pulley, the kit comprising: an unsealed bearing; a bearing cap having an orifice; a fastener to secure the bearing cap to the unsealed bearing; and a grease fitting adapted to be defined through a rotating body comprising the bearing cap and the rotator, the grease fitting adapted to be in fluid communication with the unsealed bearing.

According to an aspect, the unsealed bearing comprises an inner race, and the bearing seal cap is adapted to seal against both a shaft and the inner race. The kit may further comprise a bearing cover. According to an aspect where the kit comprises a bearing cover, the bearing seal cap may be adapted to be disposed between the bearing cover and the unsealed bearing, and the unsealed bearing may be adapted to be disposed between the bearing seal cap and the rotator.

According to another aspect of the disclosure there is provided a method of producing a regreasable idler pulley from a non-regreasable idler pulley, comprising the steps of: providing the non-regreasable idler pulley comprising a rotator and a sealed bearing; replacing the sealed bearing with an unsealed bearing; fixing a bearing seal cap having an orifice to the unsealed bearing; and aligning the orifice with a grease fitting defined through a rotating body comprising the bearing seal cap and the rotator.

The method may further include sealing the bearing seal cap against the bearing. In an aspect, the method includes sealing the bearing seal cap against the shaft. In another aspect, the method includes fixing a bearing cover against the bearing seal cap. The bearing cover may be sealed against the bearing seal cap, in an aspect.

Other aspects and features of embodiments of the present disclosure will become apparent to those ordinarily skilled in the art upon review of the following description.

DETAILED DESCRIPTION

Figure 1:
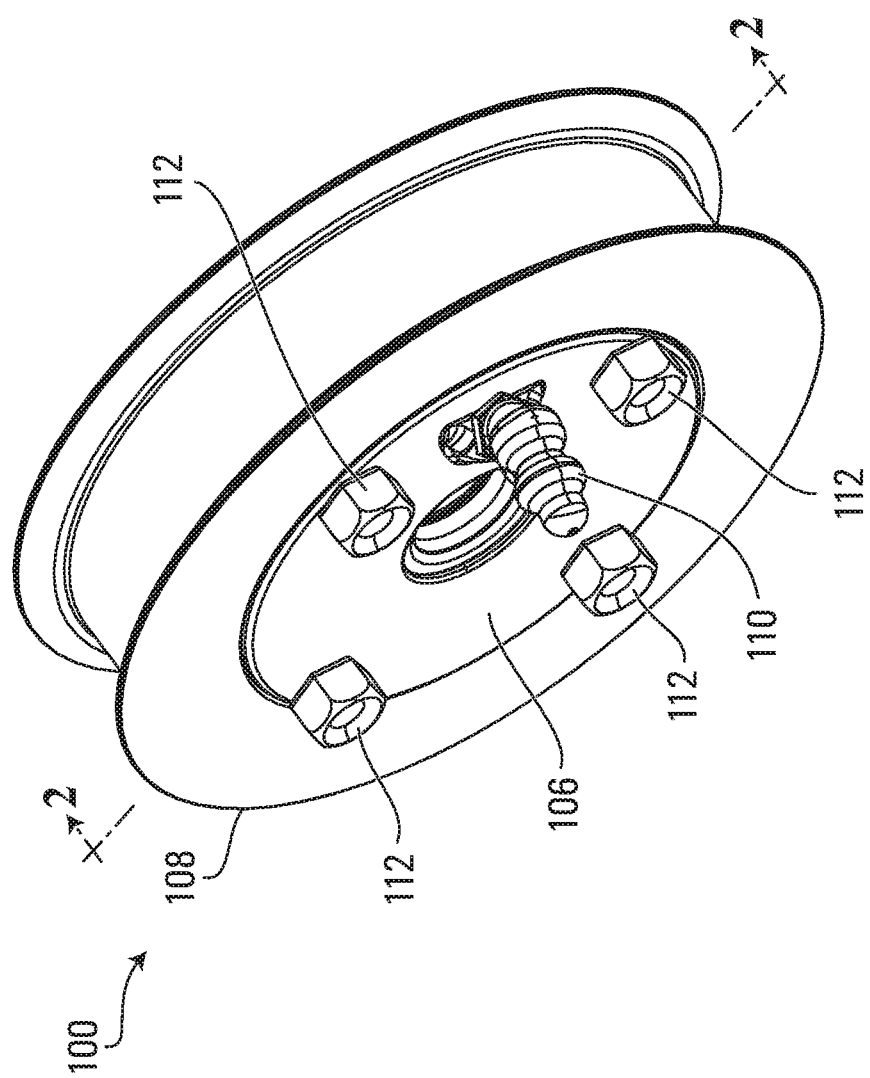
FIG. 1 is a perspective view of an idler pulley according to an embodiment.

During manufacture of the non-regreasable idler pulley, grease is added to its bearing and the bearing is sealed by a neoprene or steel cover installed by the bearing manufacturer.

Grease is used in idler pulleys to lubricate the bearing, keeping its wear to a minimum when in use. During an idler pulley's use the grease slowly breaks down, resulting in less lubrication of the bearing and increased wear.

Many non-regreasable idler pulleys have the potential for a very limited lifespan depending on the application and operating conditions. The lifespan of these pulleys is due, in part, to the temperature and load conditions the idler pulley is exposed to in addition to the amount and quality of the grease added by the manufacturer.

With non-regreasable idler pulleys, the customer is reliant upon the manufacturer to ensure a sufficient amount of high quality grease is used. The inventors have found that some non-regreasable idler pulleys, even when newly sold, have insufficient and/or improper grease. Furthermore, when the grease in the non-regreasable idler pulley breaks down or effectively wears out the owner/operator of the equipment must replace the entire idler pulley with a new idler pulley, resulting in a cost of loss of machine operation time and the added expense to the owner/operator. In some cases replacing the entire non-regreasable idler pulley is also a waste of good materials as parts of the idler pulley are still useable. In addition, some operators would rather have the option to be able to grease idler pulleys rather than to have to wait until a non-regreasable idler pulley fails.

The greasable idler pulleys described herein allow the owner/operator to maintain the idler pulley by greasing the bearing on a regular basis, for example, by following a regular maintenance schedule. The amount of re-greasing may be determined by the owner/operator, taking into account such things as operating parameters, hours of use and environmental factors. In this way, the owner/operator does not need to trust that the manufacturer has added sufficient, high quality grease. The new greasable idler pulleys described herein have been tested and found to exceed the service lives of non-greasable idlers by adding a few shots of high quality grease for every 300 hours of idler pulley operation.

In embodiments, the greasable idler pulley described herein is provided with a bearing cover. Removing the bearing cover facilitates quick and easy replacement of the bearing if, for example, the bearing fails due to insufficient greasing and/or using an improper type of grease.

In some embodiments, the greasable idler pulleys described herein are designed in a compact manner to fit into tight applications.

Now, turning to the drawings, it should be appreciated that the drawings are intended solely for illustrative purposes, and that the present invention is in no way limited to the particular example embodiments explicitly shown in the drawings and described herein.

An embodiment will now be described with reference to FIGS. 1-3. Other embodiments will be described with reference to FIGS. 4-14.

Figure 2:
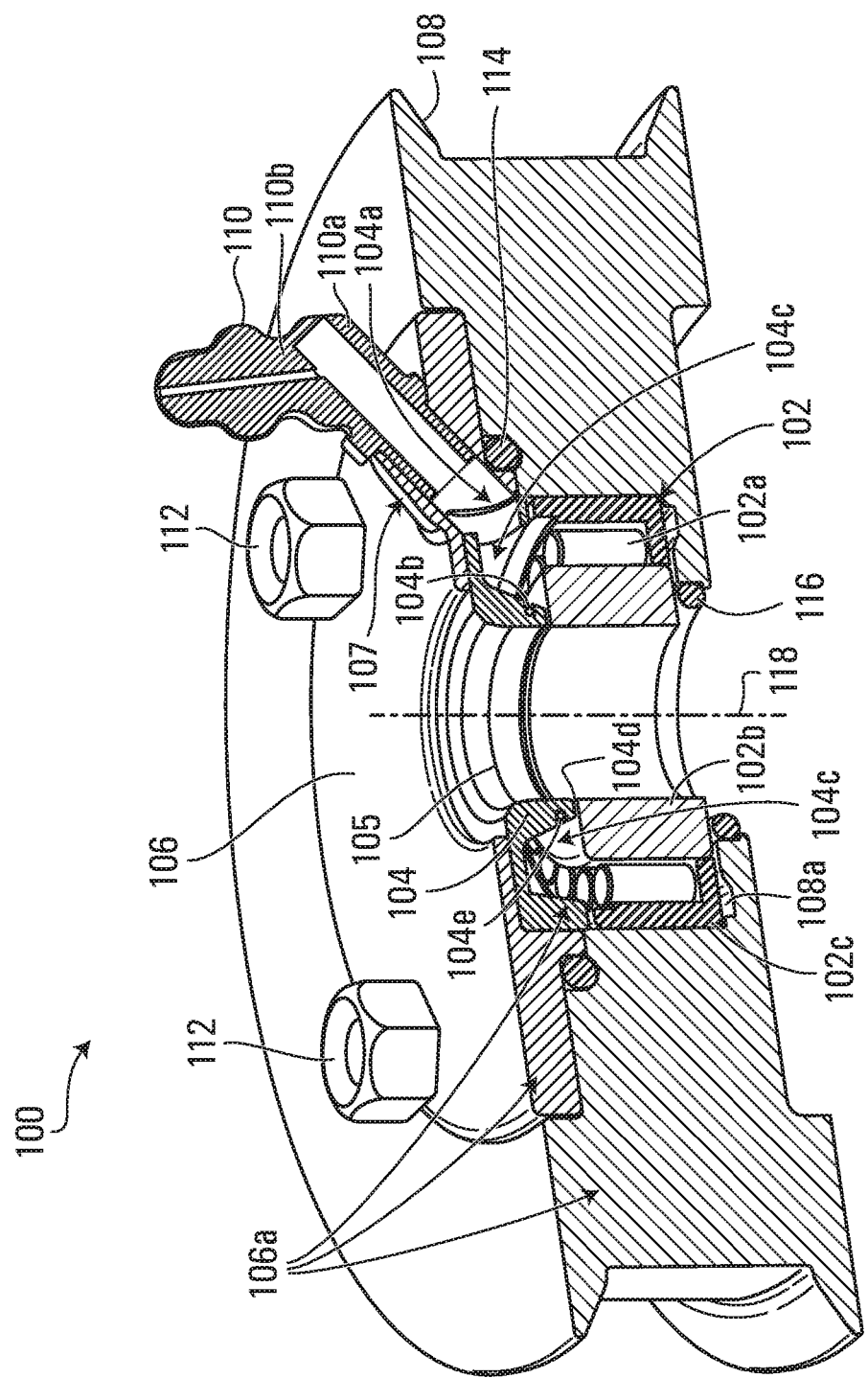
FIG. 2 is a perspective, cross section view of the idler pulley shown in FIG. 1, along a line 2-2 shown in FIG. 1.
Figure 3:
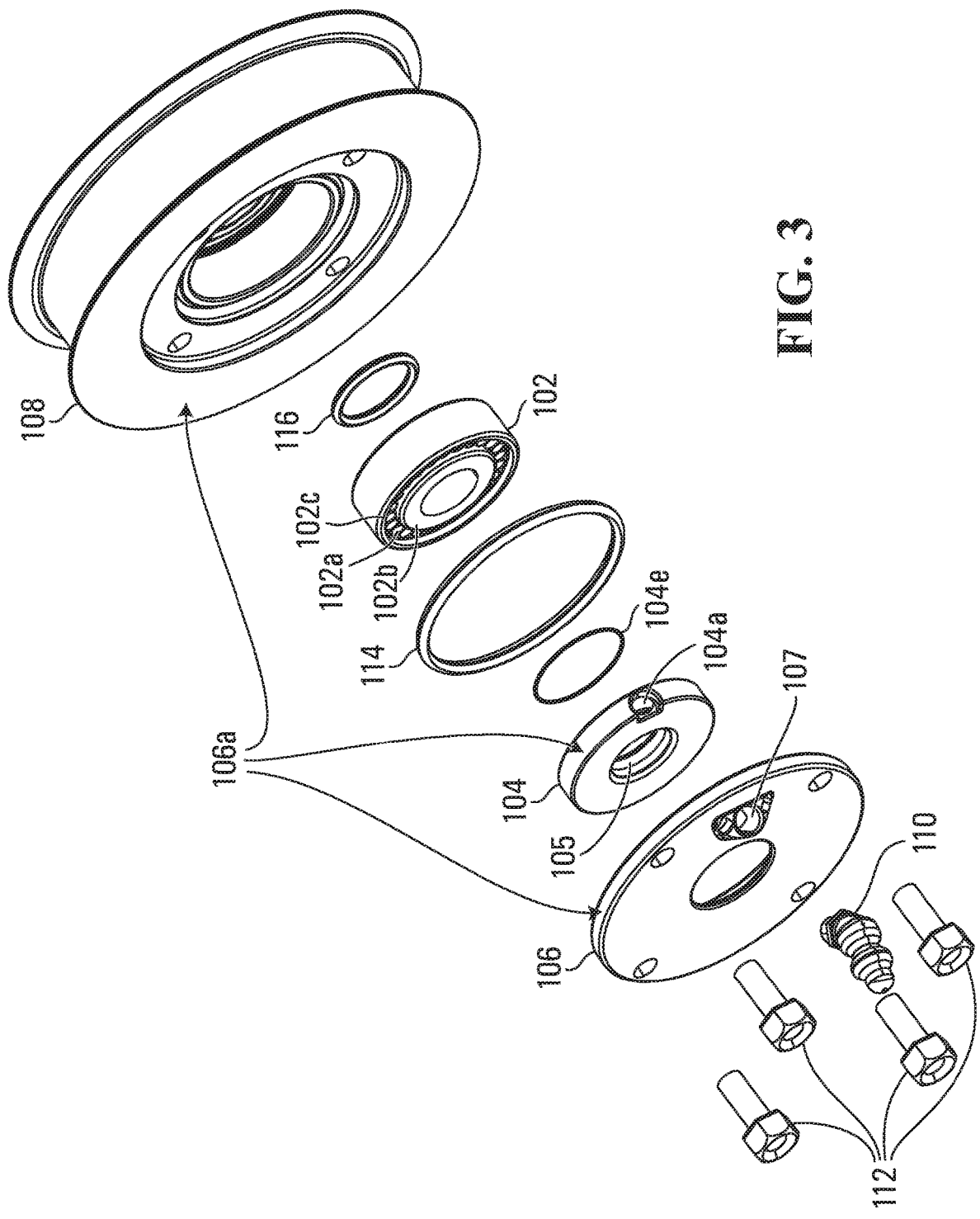
FIG. 3 is an exploded view of the idler pulley shown in FIG. 1.

FIG. 1 is a perspective view of an idler pulley 100 according to an embodiment, FIG. 2 is a perspective, cross section view of the idler pulley shown in FIG. 1, along a line 2-2 shown in FIG. 1 and FIG. 3 is an exploded view of the idler pulley 100.

In FIGS. 1-3, the idler pulley 100 generally has a bearing 102, a bearing seal cap 104, a bearing cover 106 and a rotator 108. The bearing 102 is disposed inside the rotator 108 and has an inner race 102b, cylindrical rollers 102a and an outer race 102c. As shown in FIG. 2, the bearing 102 contacts the rotator 108.

The bearing seal cap 104, the bearing cover 106, and the rotator 108 together form a rotating body 106a. Other components, such as the outer race 102c, may rotate with the rotating body 106a, as described in further detail below. In this way, the rotating body may be thought of as one or more principle components of the idler pulley, apart from the bearing, that may rotate together about a shaft (not shown).

As shown in FIG. 2, the bearing cover 106 has a receiving portion, tab, orifice or angled channel 107, which will hereinafter be referred to as the receiving portion 107 for clarity, passing from a top of the bearing cover 106 to a bottom of the bearing cover 106. An axis parallel to the receiving portion 107 is slanted, angled or off-axis relative to an axis of rotation 118 of the rotating body 106a. The receiving portion 107 receives a grease fitting 110.

The bearing cover 106 is fixed to the rotator 108 with a quick change fastener. In FIGS. 1-3 the quick change fastener is shown as bolts 112. The bolts 112 extend into the rotator 108 and are anchored into threads (not shown) in the rotator 108. While multiple bolts 112 are shown, more or fewer bolts are contemplated in embodiments. In some embodiments, no bolts are used and/or no quick change fastener is provided.

If, for example, the bearing 102 of the idler pulley 100 fails due to insufficient greasing and/or use of an improper type of grease, the bolts 112 may be removed from the idler pulley 100 to allow a user access to, amongst other components, the bearing seal cap 104. Subsequently removing the bearing seal cap 104 allows access to a bearing space 104c of the idler pulley 100 such that the bearing 102 may be repaired and/or replaced. The bolts 112 therefore facilitate replacement of the bearing 102 if, for example, the bearing 102 fails.

In FIGS. 1-3, the bearing seal cap 104 is disposed between the bearing cover 106 and the bearing 102. The bearing cover 106 thereby retains the bearing seal cap 104. The bearing 102, in turn, is disposed between the bearing seal cap 104 and the rotator 108. The bearing seal cap 104 thereby retains the bearing 102. In this way the bearing cover 106 holds the bearing seal cap 104 in place adjacent to the bearing 102.

As shown in FIG. 2, a seal 114 is disposed between the bearing cover 106 and the rotator 108, and a seal 116 is disposed between the bearing 102 and the rotator 108. The seal 116 may additionally be disposed between the shaft or a spacer, for example, and the rotator 108, when the shaft or the spacer extends at least partially through the idler pulley 100. A seal may also be formed at an interface 104d such that the bearing seal cap 104 seals against the inner race 102b. The seal at the interface 104d may be formed by an interference fit, for example, between the bearing seal cap 104 and the inner race 102b (see FIG. 3).

Additional or other seals may be provided in addition to or in lieu of those shown in FIGS. 2 and 3. For example, a second seal may be disposed between the bearing 102 and the rotator 108, such as for example in a recess 108a, or the bearing 102 may seal against the rotator 108 directly by an interference fit. A seal may also be disposed between the bearing seal cap 104 and the bearing cover 106, or this seal may be effected by an interference fit between the bearing seal cap 104 and the bearing cover 106.

To aid in sealing, a retaining means, such as a spring retainer 104e as shown in FIG. 2, may be placed in a recess 104b of the bearing seal cap 104 to bias the bearing seal cap 104 against the shaft. While the recess 104b and the spring retainer 104e are only labelled on one, respective side of the bearing seal cap 104 for clarity, it is to be understood that in the embodiment shown in FIGS. 1-3 both of the recess 104b and the spring retainer 104e extend annularly around the bearing seal cap 104.

Turning now to the bearing 102, the outer race 102c of the bearing 102 is coupled to the rotator 108 and the inner race 102b of the bearing 102 is coupled to the shaft. The cylindrical rollers 102a are disposed between the inner race 102b and the outer race 102c such that the inner race 102b and the outer race 102c may rotate with respect to each other. The bearing 102 thereby enables the rotator 108, and other components of the idler pulley 100 such as the bearing seal cap 104 and the bearing cover 106, to rotate with respect to the shaft. In an embodiment, the bearing 102 may be coupled to the shaft and to the rotator 108 by a friction fit. Other means of coupling the bearing 102 to the shaft and to the rotator 108 are also contemplated, such as by using a spline.

The rotator 108 of FIGS. 1-3 is adapted to be coupled to a belt, chain or other torque-transferring means. When the rotator 108 rotates with respect to or about the shaft, the bearing cover 106 and the bearing seal cap 104, amongst other elements, rotate with the rotator 108. The shaft is rotationally decoupled from the rotator 108, and therefore need not rotate with the rotator 108.

The grease fitting 110 allows grease to be provided to the bearing 102. The grease fitting 110 is defined through or received by the rotating body 106a. As shown in FIG. 2, the grease fitting 110 is defined through the bearing cover 106. The grease fitting 110 has two portions, 110a and 110b, as shown in FIG. 2. Portion 110a extends at substantially a 45° angle relative to the axis of rotation 118 of the rotating body 106a, and portion 110b extends substantially parallel to the axis of rotation 118 of the rotating body 106a.

The grease fitting 110 is in fluid communication with the bearing 102 through an orifice 104a in the bearing seal cap 104. The orifice 104a is perhaps best seen in FIG. 3. In preferred embodiments, the grease fitting 110 reversibly seals the bearing 102 by means of a one-way valve (not shown). In FIGS. 1-3 the grease fitting 110 is radially displaced from the axis of rotation 118 of the rotating body 106a.

To add grease to the bearing 102, a grease injector (not shown) may be coupled to the grease fitting 110. Grease is then communicated through the grease fitting 110 into the receiving portion 107 of the bearing cover 106 and subsequently through the orifice 104a into the space 104c adjacent to the bearing 102. By pressure or other means the grease in the space 104c is communicated into the cylindrical rollers 102a of the bearing 102.

The bearing 102 and the space 104c are in fluid communication with each other, and may be sealed with a variety of seals to prevent loss of grease from the idler pulley 100.

The seals 114 and 116, the seal formed at the intersection 104d and the grease fitting 110, amongst other features, may cooperate to seal the bearing 102 and the space 104c, such that when grease is provided through the grease fitting 110 it is retained in or near the bearing 102.

A seal may also be formed at a band 105 on the bearing seal cap 104 between the bearing seal cap 104 and the shaft. The seal at the band 105 may be integral with the bearing seal cap 104, and therefore rotate with respect to the shaft. In another embodiment, the seal at the band 105 may be rotationally fixed to the shaft and rotate with respect to the bearing seal cap 104. The combination of the seal formed at the band 105 and the seal formed at the interface 104d allow the bearing seal cap 104 to seal against both the shaft and the inner race 102 of the bearing.

The seals described herein may substantially and/or completely seal the bearing 102 from the outside environment. However, each of the seals described herein are optional, and only partial sealing may be effective depending on the desired application.

For example, in an embodiment where the idler pulley 100 is used in the orientation shown in FIG. 2, partial sealing may be sufficient to retain grease in or near the bearing 102. In both embodiments where a substantial or a complete sealing of the bearing 102 is effected, the idler pulley 100 may be referred to a sealed and greasable idler pulley.

The bearing seal cap 104, the bearing cover 106 and the rotator 108 may be made of any material that is sufficiently rigid, for example, stainless steel or plastic. The bearing 102 may be any mechanical bearing that is designed to contain grease. In one embodiment, the bearing 102 could be a spherical roller bearing. In FIG. 1 the rotator 108 is a single pulley, although other rotators are contemplated in embodiments, such as a plurality of pulleys or one or more sprockets.

Figure 4:
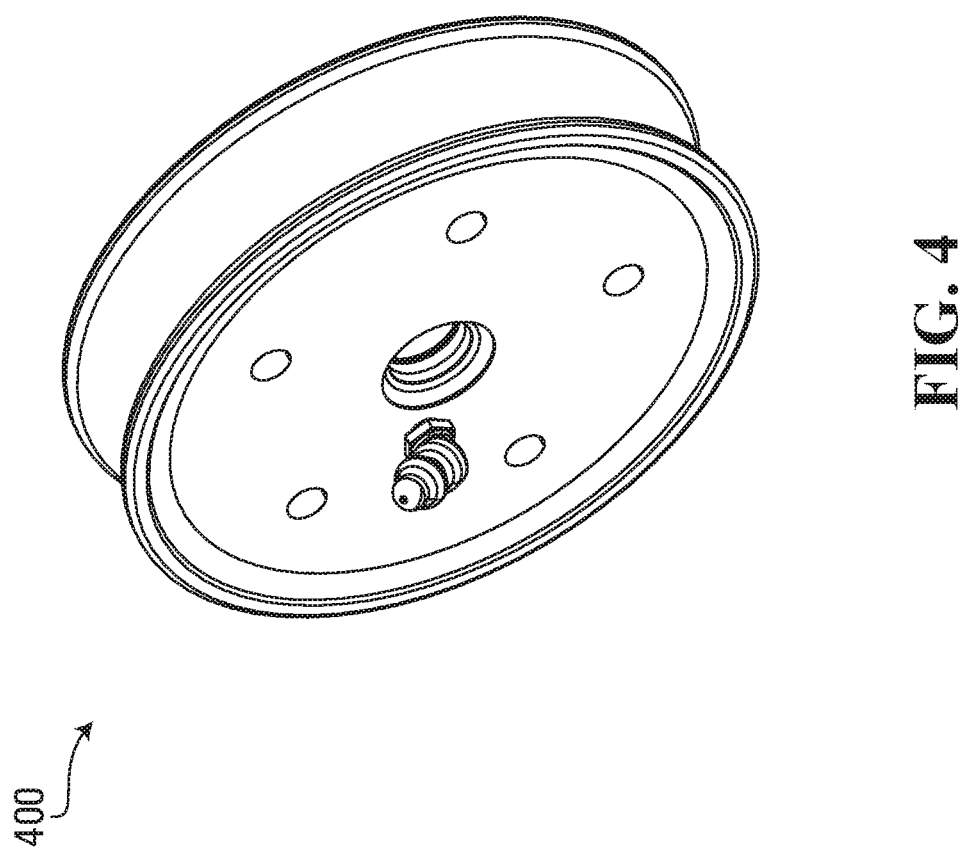
FIG. 4 is a perspective view of an idler pulley according to a second embodiment.
Figure 5:
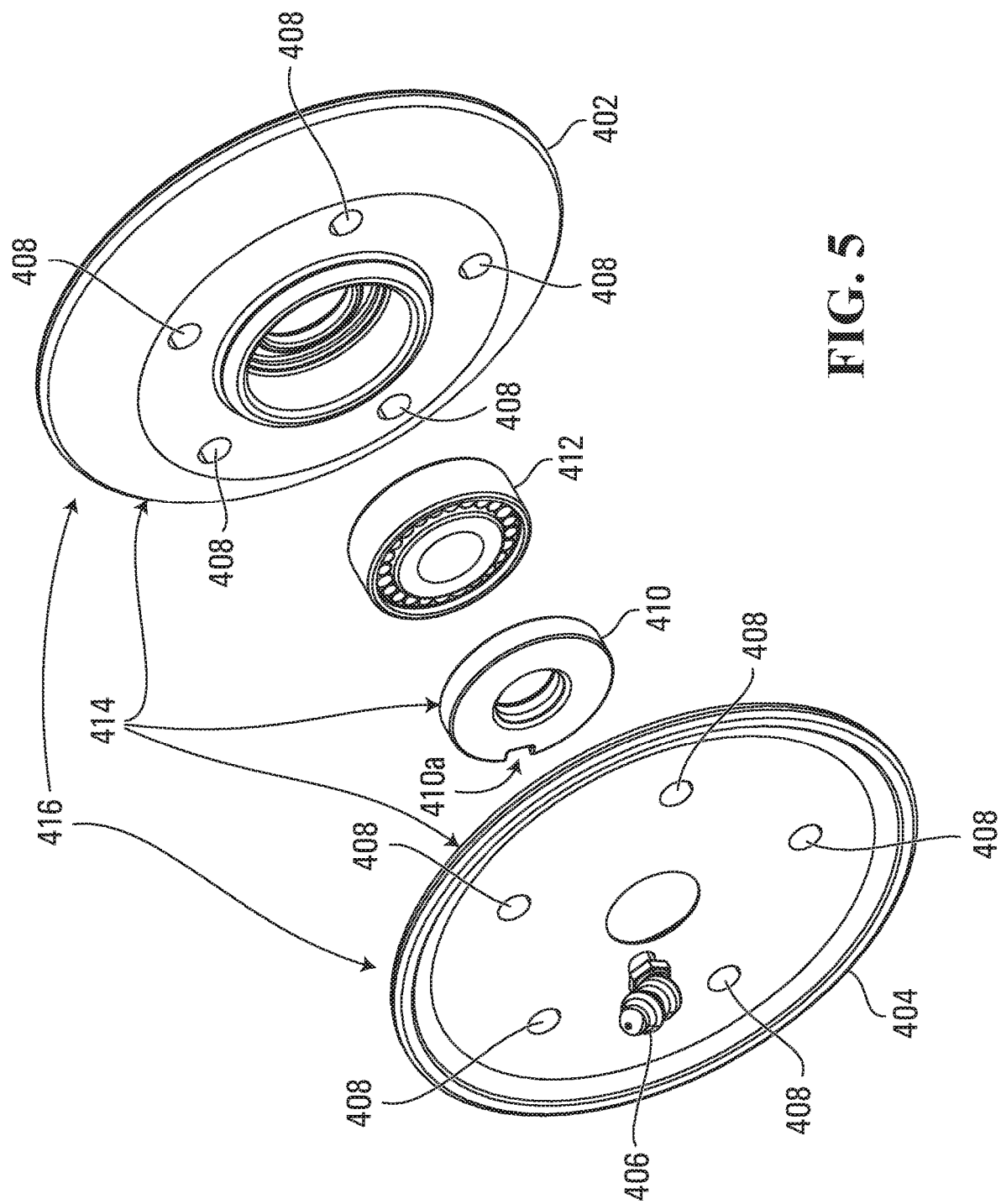
FIG. 5 is an exploded view of the idler pulley of FIG. 4.

The bearing seal cap 104, the bearing cover 106 and the rotator 108 are shown as distinct pieces in FIGS. 1-3, however, any two or more of the bearing seal cap 104, the bearing cover 106, and/or the rotator 108 may be formed as a single, integral piece. For example, as shown in FIGS. 4 and 5 and discussed below, a bearing cover may be integral with a rotator. In an embodiment, the outer race 102c may be formed integral with the rotating body 106a.

The seals 114 and 116 may be made of any material sufficiently pliable and durable to create a seal. For example, plastic O-rings may be used for the seals 114 and 116.

The grease fitting 110 can be any grease fitting that allows grease to be conducted from the grease injector through to the orifice 104a, for example, a grease zerk or grease nipple can be used. While the grease fitting 110 is shown having two portions, 110a and 110b, the grease fitting 110 may have only one portion. In an embodiment, the grease fitting 110 may have only one portion extending at substantially a 45° angle relative to the axis of rotation 118 of the rotating body 106a. In another embodiment, the grease fitting 100 may have only one portion extending substantially parallel to the axis of rotation 118 of the rotating body 106a.

Turning now to FIGS. 4 and 5, FIG. 4 is a perspective view of an idler pulley 400 according to a second embodiment, and FIG. 5 is an exploded view of the idler pulley 400 of FIG. 4.

As is perhaps most clearly shown in FIG. 5, the idler pulley 400 generally has a first component 402, a second component 404, a bearing seal cap 410 and a bearing 412. The first component 402 and the second component 404 together form a rotator 416. A grease fitting 406 is defined through or received by the second component 404. The first component 402, the second component 404 and the bearing seal cap 410 are collectively a rotating body 414.

Both the first component 402 and the second component 404 have multiple, corresponding through holes 408. The through holes 408 allow the first component 402 to be secured against the second component 404, for example, using a quick change fastener such as bolts or rivets (not shown) through one or more of the through holes 408. Other means to fasten the first component 402 to the second component 404 are also contemplated, for example, by using a snap fitting. While not labelled as such, the rotating body 414 may comprise a bearing cover integral with the rotator 416.

The idler pulley 400 may be formed by securing the second component 404 to the first component 402 with the bearing seal cap 410 and the bearing 412 placed therebetween. The rotating body 414, and other components, may then rotate with respect to a shaft (not shown) by virtue of the bearing 412.

The bearing 412, the bearing seal cap 410 and the grease fitting 406 are made of similar materials and function in a similar manner to the bearing 102, the bearing seal cap 104 and the grease fitting 110 of FIGS. 1-3, respectively. For example, the bearing 412 is greasable by the grease fitting 406 defined through or received by the second component 404 and in fluid communication with the bearing 412 through an orifice 410a in the bearing seal cap 410. The grease fitting 406 could, instead of the form depicted in FIGS. 4-5, have a similar geometry to the grease fitting 110.

While no seals are shown in FIGS. 4 and 5, sealing to prevent grease from being communicated from the idler pulley 400 to the outside environment may be effected via one or more seals (not shown) provided between the various components, and may be similar to the sealing described with respect to FIGS. 1-3, above.

Any two or more of the bearing seal cap 410, the bearing 412 and the second component 404 may be formed integrally. Any two or more of the bearing seal cap 410, the bearing 412 and the first component 402 may be formed integrally as a single component.

Figure 6:
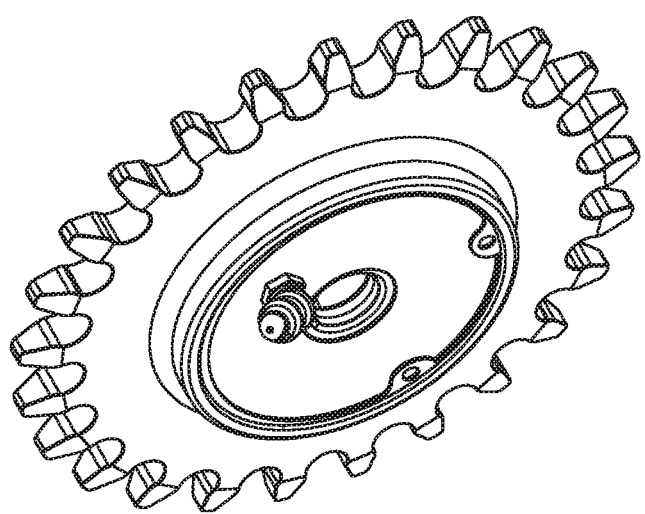
FIG. 6 is a perspective view of an idler pulley according to a third embodiment.
Figure 7:
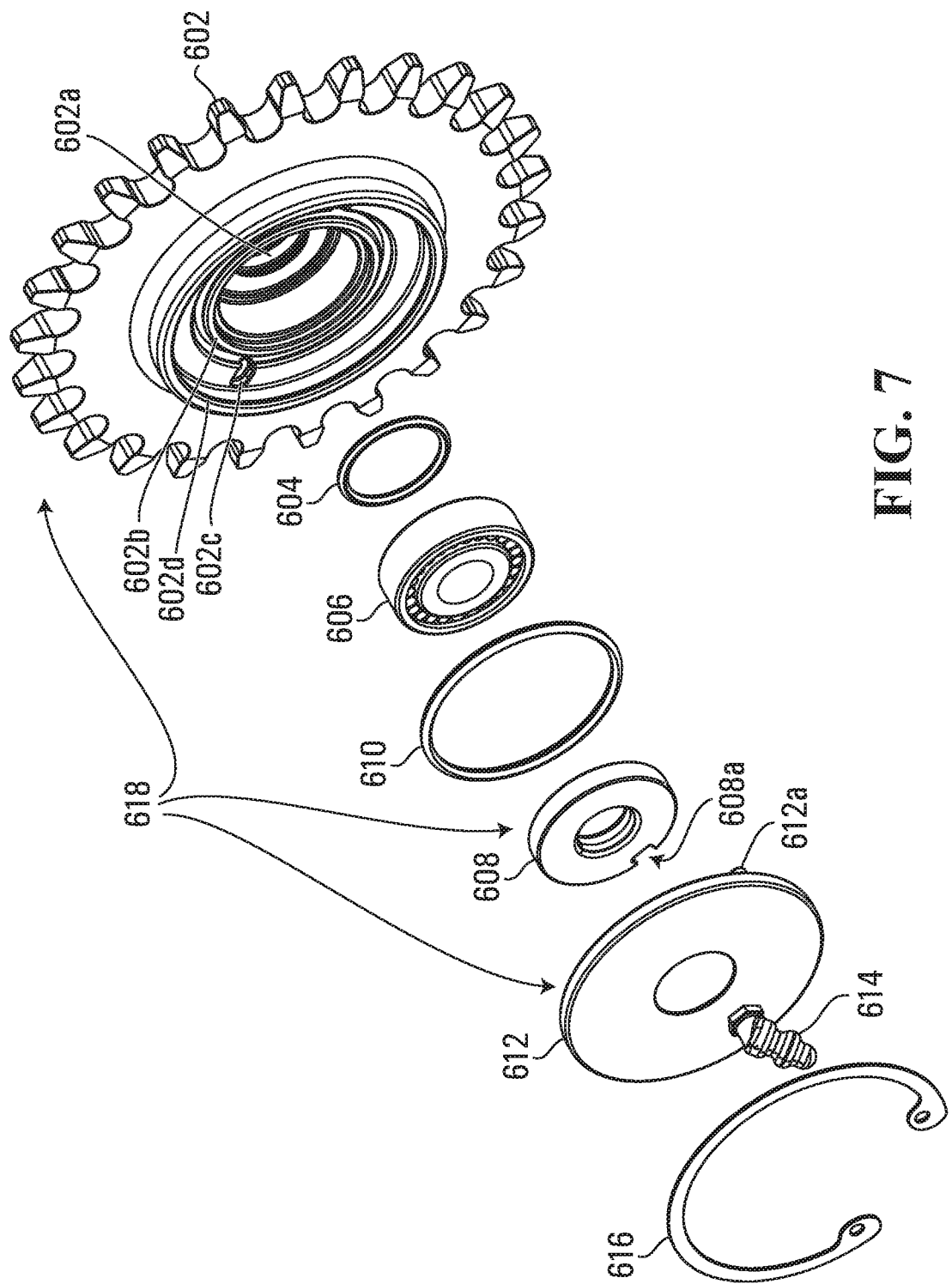
FIG. 7 is an exploded view of the idler pulley of FIG. 6.

Turning now to FIGS. 6 and 7, FIG. 6 is a perspective view of an idler pulley 600 according to a third embodiment and FIG. 7 is an exploded view of the idler pulley 600 of FIG. 6.

As shown in FIG. 7, the idler pulley 600 generally has a rotator 602, a bearing 606, a bearing seal cap 608 and a bearing cover 612. In this embodiment, the rotator 602, the bearing seal cap 608 and the bearing cover 612 are collectively a rotating body 618. In FIGS. 6 and 7 the rotator 602 is a sprocket.

As shown in FIG. 7, the bearing cover 612 is secured to the rotator 602 with a snap ring 616 that engages a shoulder 602d of the rotator 602 when the idler pulley 600 is assembled. The rotator 602 is also provided with one or more recesses 602c to each receive a respective protrusion 612a of the bearing cover 612. In the embodiment shown in FIGS. 6 and 7 there are two recesses 602c on the rotator 602 and two protrusions 612a on the bearing seal cap 612, although only one recess 602c and one protrusion 612a can be seen in FIG. 7. The mating between the recesses 602c and the protrusions 612a resists rotation between the bearing seal cap 612 and the rotator 602.

The bearing 606 enables the rotating body 618, amongst other elements, to rotate with respect to a shaft (not shown), and a grease fitting 614 provided in the bearing cover 612 allows grease to be communicated to the bearing 606 through an orifice 608a in the bearing seal cap 608, in a manner analogous to how grease is communicated to the bearing 102 through the grease fitting 110, the orifice 104a and into the bearing 102.

In an assembled state of the idler pulley 600, a seal 604 rests in a groove 602a of the rotator 602 to seal the bearing 606 against the shaft, and a seal 610 rests in a groove 602b of the rotator 602 to seal the bearing cover 612 against the rotator 602.

The rotator 602, the bearing 606, the bearing seal cap 608 the grease fitting 614 and the bearing cover 612, function similar to, may be made of similar materials and have similar variants as the rotator 108, the bearing 102, the bearing seal cap 104, the grease fitting 110 and the bearing cover 106, respectively, of FIGS. 1-3. The seals 604, 610 may be made of similar materials and functions similarly to the seals 116, 114 of FIGS. 1-3. The snap ring 616 may be made of metal.

Other seals may be provided in addition to or in lieu of those shown in FIG. 7. In certain embodiments, one or more of the seals 604, 610 may be omitted.

Figure 8:
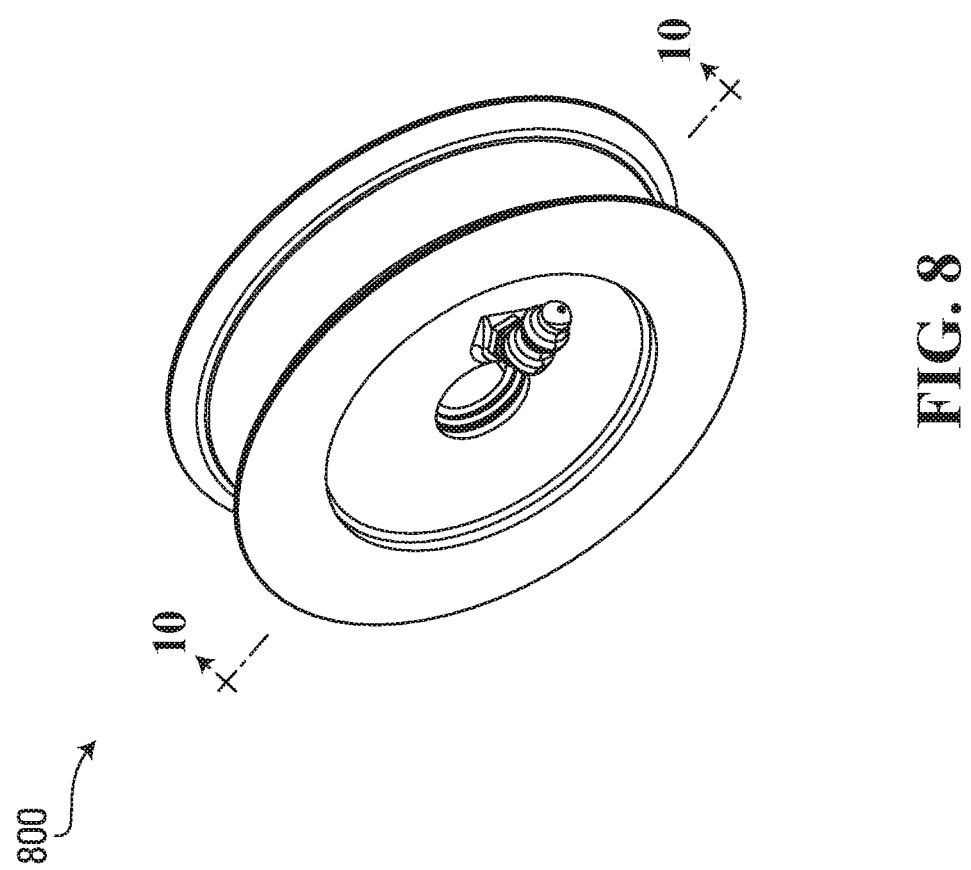
FIG. 8 is a perspective view of an idler pulley according to a fourth embodiment.
Figure 9:
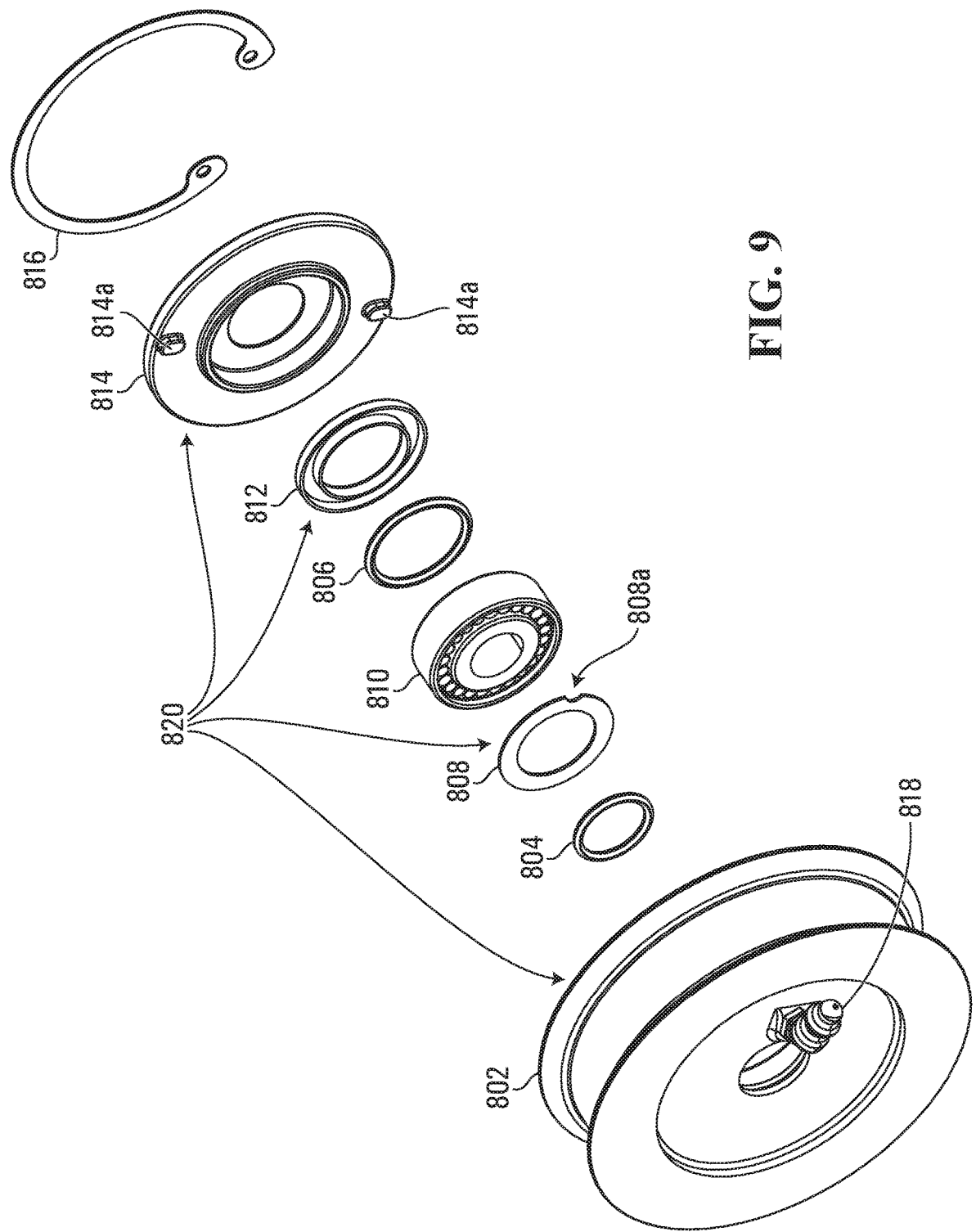
FIG. 9 is an exploded view of the idler pulley of FIG. 8.
Figure 10:
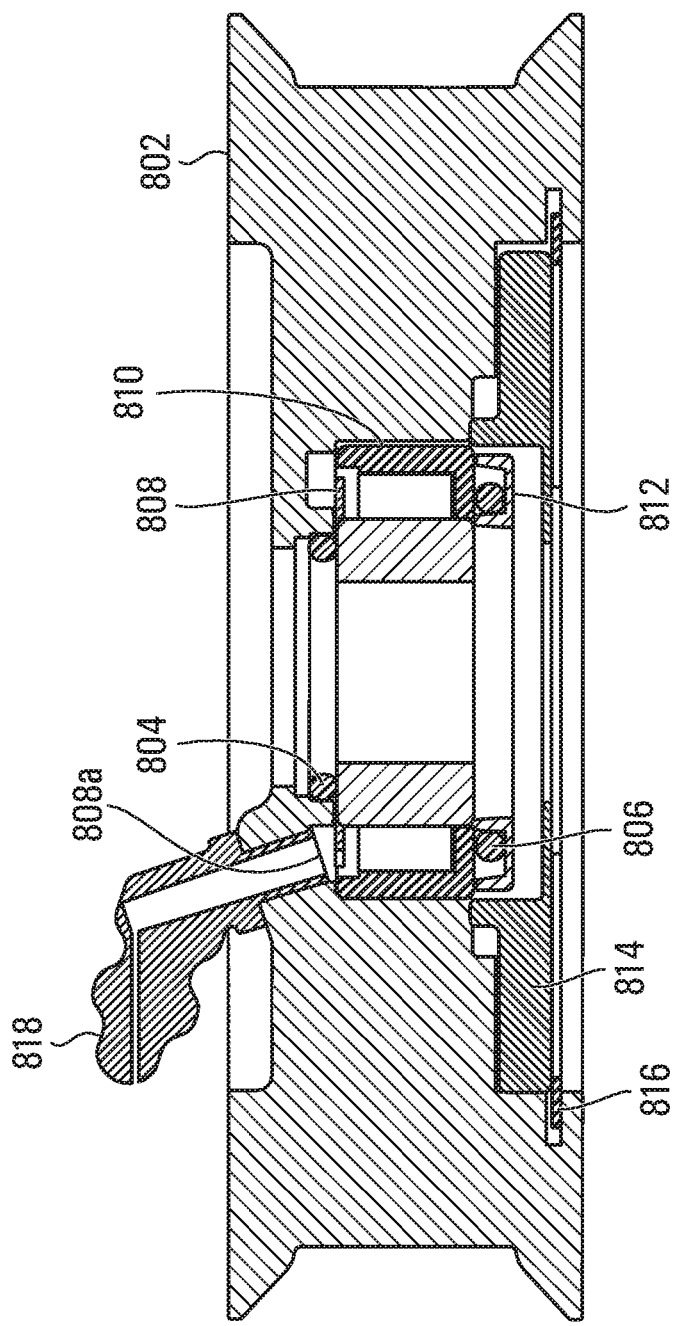
FIG. 10 is a cross section of the idler pulley of FIG. 8, along a line 10-10 shown in FIG. 8.

Turning now to FIGS. 8-10, FIG. 8 is a perspective view of an idler pulley 800 according to a fourth embodiment, FIG. 9 is an exploded view of the idler pulley 800 of FIG. 8, and FIG. 10 is a cross section of the idler pulley 800 of FIG. 8, along a line 10-10 shown in FIG. 8.

With reference to FIG. 9, the idler pulley 800 has, among other components, a rotator 802, a bearing cover 814, a first bearing seal cap 808, a bearing 810 and a second bearing seal cap 812. In the embodiment shown in FIGS. 8-10, a rotating body 820 includes the rotator 802, the bearing cover 814, the first bearing seal cap 808 and the second bearing seal cap 812.

As described above with respect to the bearing 102 of FIGS. 1-3, the bearing 810 enables the rotating body 820 to rotate with respect to a shaft (not shown).

However, the idler pulley 800 differs, in part, from the idler pulley 100 in that two bearing seal caps are provided, namely, the first bearing seal 808 and the second bearing seal 812. Further, a grease fitting 818, defined through or received by the rotator 802, allows the bearing 810 to be greased by communicating grease from the grease fitting 818 to the bearing 810 through an orifice 808a in the first bearing seal cap 808.

Other differences between the embodiment shown in FIGS. 8-10 and the embodiment shown in FIGS. 1-3 include that the grease fitting 818 in FIG. 9 is shown with an orientation similar to the grease fitting 406 shown in FIGS. 4 and 5. One orifice 808a is shown in FIG. 9, which is in alignment with the grease fitting 818. However, in another embodiment, more than one orifice may be provided and one of these orifices may be in alignment with the grease fitting 818.

A second bearing seal cap 812 is provided on the other end of the bearing 810 to seal the bearing 810. In another embodiment, instead of a second bearing seal cap 812 the bearing 810 may be sealed on one side as in a conventional sealed bearing, with a bottom plate. In a further embodiment, the bearing 810 may seal against the bearing cover 814 by one or more seals or may alternatively or additionally seal directly against the bearing cover 814.

As shown most clearly in FIG. 10, a seal 804 is provided to seal between the bearing 810 and the rotator 802. A seal 806 is provided to aid in sealing the bearing 810.

Similar to the embodiment described in FIGS. 6 and 7, the bearing cover 814 includes two protrusions 814a to mate with corresponding recesses (not shown) on the rotator 802. The mating between the protrusions 814a and the corresponding recesses is similar to and provides similar function as the mating between the protrusions 612a and the recesses 602c. A snap ring 816 is provided to retain the bearing cover 814 against the rotator 802, and functions similarly to and is made of similar materials as the snap ring 616 described herein. The seals 804, 806 may be made of similar materials to the seals 114, 116 as described above in relation to FIGS. 1-3.

Figure 11:
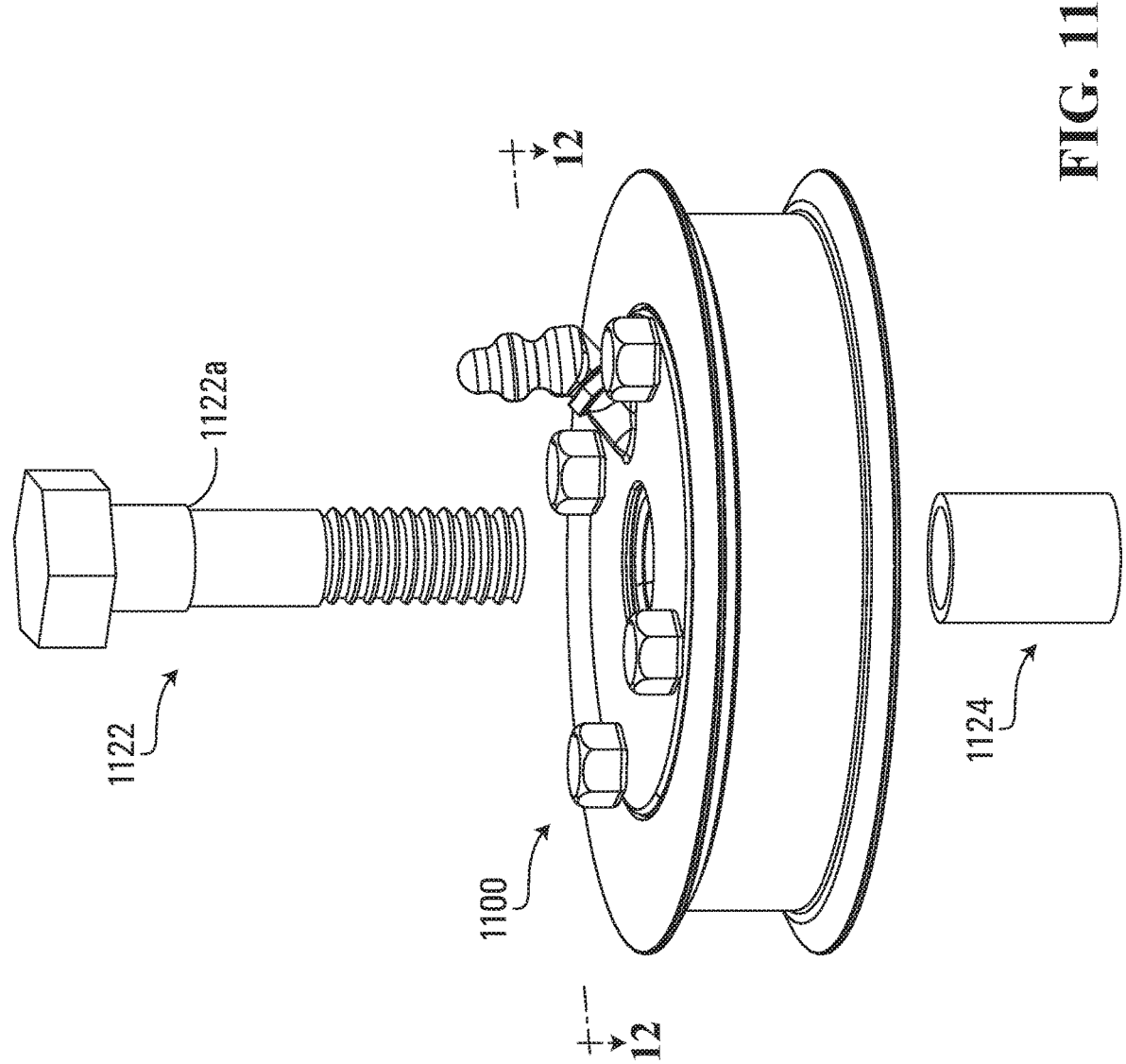
FIG. 11 is a perspective, view of an idler pulley according to a fifth embodiment, showing a spacer and a bolt adjacent thereto.
Figure 12:
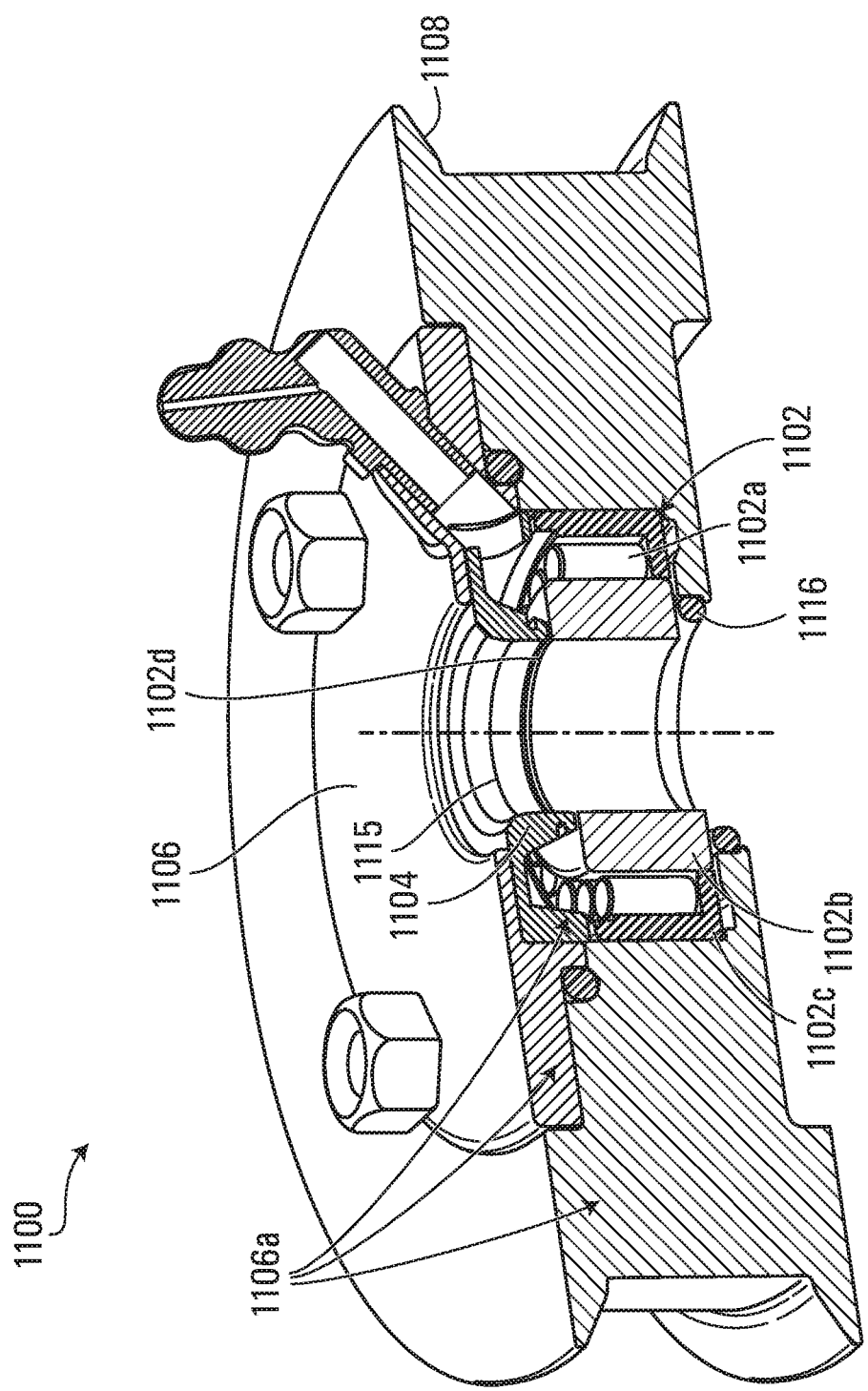
FIG. 12 is a perspective, cross section view of the idler pulley shown in FIG. 11, along a line 12-12 shown in FIG. 11.
Figure 13:
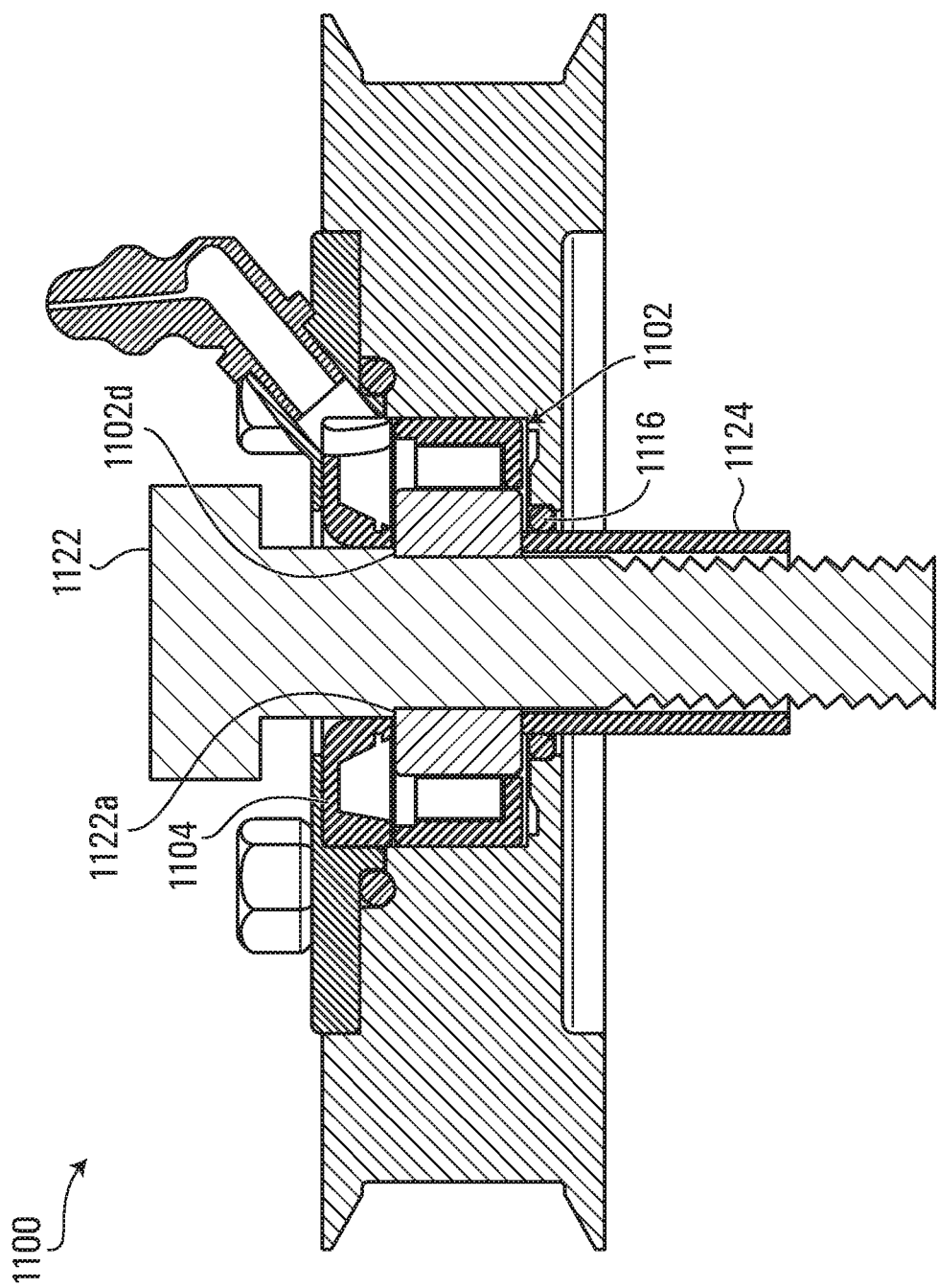
FIG. 13 is a cross section view of the idler pulley of FIG. 11, along the line 12-12 shown in FIG. 11, with the bolt and the spacer of FIG. 11 assembled thereto.

Turning now to FIGS. 11-13, FIG. 11 is a perspective, view of an idler pulley 1100 according to a fifth embodiment showing a spacer 1124 and a bolt 1122 adjacent thereto. FIG. 12 is a perspective, cross section view of the idler pulley 1100 shown in FIG. 11, along a line 12-12 shown in FIG. 11. FIG. 13 is a cross section view of the idler pulley 1100 of FIG. 11, along the line 12-12 shown in FIG. 11, with the bolt 1122 and the spacer 1124 of FIG. 11 assembled thereto.

With reference to FIG. 12, the idler pulley 1100 is similar to the idler pulley 100 described herein and includes many shared features. For example, the idler pulley 1100 generally has a bearing 1102, a bearing seal cap 1104, a bearing cover 1106 and a rotator 1108. In the embodiment shown in FIGS. 11-13, the bearing seal cap 1104, the bearing cover 1106, and the rotator 1108 together form a rotating body 1106a.

The bearing 1102 is disposed inside the rotator 1108 and has an inner race 1102b, cylindrical rollers 1102a and an outer race 1102c. For clarity, some of the features that are shared between the idler pulley 100 and the idler pulley 1100 are not labelled in the drawings or described herein.

The difference between the idler pulley 100 and the idler pulley 1100 is that the idler pulley 1100 has a face 1102d on the bearing 1102 that extends radially inward from the bearing seal cap 1104. As shown in FIG. 12, the face 1102d is orthogonal to an axis of rotation of the idler pulley 1100 and is exposed to the environment outside the idler pulley 1100.

Now, referring to FIG. 13, in this embodiment in an assembled state the bolt 1122 passes through the idler pulley 1100 and engages with the spacer 1124. The engagement between the bolt 1122 and the spacer 1124 may be a threaded connection, for example, but could also be an interference fit. In the embodiment of FIG. 13, the bolt 1122 is rotationally decoupled from the spacer 1124 such that the bolt 1122 may rotate independently of the spacer 1124.

As shown in FIG. 13, a shoulder 1122a on the bolt 1122 abuts or rests against the face 1102d of the bearing 1102. This may prevent the bolt 1122 from moving axially relative to the idler pulley 1100 at least in a first direction. The spacer 1124 abuts or rests against the bearing 1102. In the embodiment where the spacer 1124 is coupled to the bolt 1122, the spacer 1124 resists the bolt 1122 moving axially relative to the idler pulley 1100 at least in a second direction.

A seal may be formed between the bolt 1122 and the bearing seal cap 1104, such as at a band 1115. A seal may also be formed, for example, by the seal 1116 between the spacer 1124 and the rotator 1108 to help seal the bearing 1102 from the outside environment.

Figure 14:
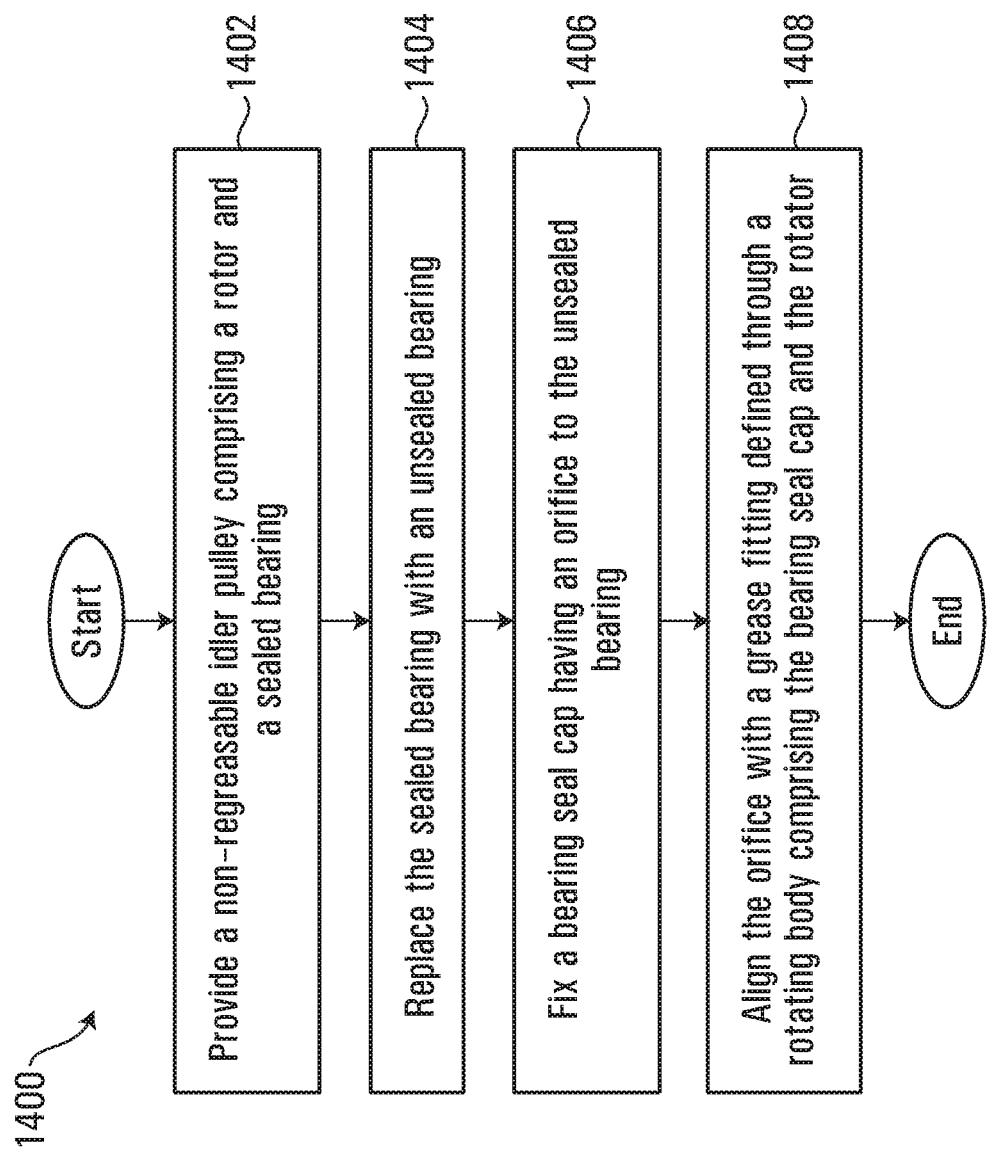
FIG. 14 is a flow chart of a method according to an embodiment.

Turning now to FIG. 14, FIG. 14 is a flow chart of a method 1400 according to one embodiment. The method 1400 is a method of producing a regreasable idler pulley from a non-regreasable idler pulley.

According to FIG. 14, the method 1400 includes, at 1402, providing a non-regreasable idler pulley comprising a rotator and a sealed bearing. The non-regreasable idler pulley may be an idler pulley described herein. The rotator may be one or more pulleys or sprockets, for example.

The method 1400 further includes, at 1404, replacing the sealed bearing with an unsealed bearing. Replacing the sealed bearing may involve, for example, disengaging a fastening means, such as screw, to free the sealed bearing from the rotator of the non-regreasable idler pulley. In the embodiment where the non-regreasable idler pulley is a sealed, non-regreasable idler pulley, replacing the sealed bearing may involve breaking a seal between the rotator and the sealed bearing. The unsealed bearing may be a bearing such as the bearing 102 described herein. In an embodiment, the unsealed bearing may be a bearing that has had its bearing cover plate removed.

At the next step, 1406, the method 1400 further includes fixing a bearing seal cap having an orifice to the unsealed bearing. In an embodiment, fixing the bearing seal cap to the unsealed bearing may involve engaging a fastening means that connects and/or secures the bearing seal cap to the unsealed bearing. In another embodiment, fixing the bearing seal cap could involve placing, connecting or otherwise securing the bearing seal cap to the rotator, thereby fixing the bearing seal cap to the unsealed bearing in the rotator. For example, a snap fitting, such as the snap ring 616 described herein, could be used to fix the bearing seal cap to the unsealed bearing.

At the final step shown in FIG. 14, 1408, the method 1400 additionally includes aligning the orifice with a grease fitting defined through a rotating body comprising the bearing seal cap and the rotator. Aligning the orifice of the bearing seal cap with the grease fitting defined through the rotating body allows grease to be communicated from the grease fitting to the bearing to allow the unsealed bearing to be greased.

While not shown in FIG. 14, the method 1400 may further include sealing the bearing seal cap against the bearing and/or sealing the bearing seal cap against the shaft. In an embodiment, the method 1400 may include fixing a bearing cover against the bearing seal cap. In embodiments where the bearing cover is provided, the method 1400 may include sealing the bearing cover against the bearing seal cap. The sealing may be accomplished using any of the seals described herein in addition to further/other seals. The seals may also be integrally formed on parts of the idler pulley, for example.

The provision of components as shown in FIG. 14 need not necessarily involve manufacturing those components. For example, components could be sourced from a manufacturer and need not necessarily be manufactured by the same entity that actually builds idler pulley disclosed herein. Component manufacturing and assembly could thus be performed by separate entities, in which case a manufacturer "provides" system components by manufacturing them, and an assembler "provides" the components by purchasing them from a manufacturer or distributor.

Kits are also contemplated. For example, a kit for assembling the idler pulley may include a rotating body, a bearing and grease fitting defined through the rotating body. In an embodiment, the bearing is the bearing 100 and the rotating body is the rotating body 106a, and the bearing and the rotating body of the kit have similar characteristics to and are made of similar materials as the bearing 100 and the rotating body 106a described herein. In another embodiment, the bearing and the rotating body of the kit may be another bearing and another rotating body described herein.

In another embodiment, a kit may be for retrofitting a non-regreasable idler pulley including a rotator to a regreasable idler pulley, the kit including: an unsealed bearing; a bearing cap having an orifice; a fastener; and a grease fitting. The fastener may be to secure the bearing cap to the unsealed bearing. The grease fitting may be adapted to be defined through a rotating body comprising the bearing cap and the rotator. The grease fitting may also be adapted to be in fluid communication with the unsealed bearing.

In this embodiment, the non-regreasable idler pulley may be a non-regreasable idler pulley described herein. The rotator may be the rotator 108 and the unsealed bearing may be the bearing 102. The bearing cap may be the bearing cap 104, the fastener may be the bolts 112, and the grease fitting may be the grease fitting 110. The components of this kit may have similar features to the components described herein. In another embodiment, the components of this kit may be other components, such as those described in other embodiments herein.

Numbers and types of components shown in the drawings and described herein are also intended for illustrative purposes. Other types and/or numbers of components could be used in other embodiments.

What is claimed is:

1. An idler pulley, comprising:
   a rotating body comprising:
      a bearing seal cap having an orifice; and
      a rotator;
   a bearing to enable the rotating body to rotate with respect to a shaft; and
   a grease fitting defined through the rotating body and rotatable therewith, the grease fitting being in fluid communication with the bearing through the orifice in the bearing seal cap.

2. The idler pulley of claim 1, wherein the bearing comprises an inner race, and the bearing seal cap is adapted to seal against both the shaft and the inner race.

3. The idler pulley of claim 2, wherein the bearing seal cap is biased against the shaft by a spring retainer.

4. The idler pulley of claim 1, wherein the rotating body further comprises a bearing cover.

5. The idler pulley of claim 4, wherein the bearing seal cap is disposed between the bearing cover and the bearing, and the bearing is disposed between the bearing seal cap and the rotator.

6. The idler pulley of claim 4, wherein the grease fitting is further defined through the bearing cover.

7. The idler pulley of claim 4, wherein the bearing cover is coupled to the rotator with a quick change fastener.

8. The idler pulley of claim 4, wherein the bearing cover is integral with the rotator.

9. The idler pulley of claim 1, wherein the grease fitting is radially displaced from an axis of rotation of the rotating body.

10. The idler pulley of claim 1, wherein the rotator is a pulley.

11. The idler pulley of claim 1, wherein the rotator is a sprocket.

12. A kit for retrofitting a non-regreasable idler pulley comprising a rotator to a regreasable idler pulley, the kit comprising:
    an unsealed bearing;
    a bearing seal cap having an orifice;
    a fastener to secure the bearing seal cap to the unsealed bearing; and
    a grease fitting adapted to be defined through a rotating body comprising the bearing seal cap and the rotator, the grease fitting being rotatable with the rotating body and adapted to be in fluid communication with the unsealed bearing.

13. The kit of claim 12, wherein the unsealed bearing comprises an inner race, and the bearing seal cap is adapted to seal against both a shaft and the inner race.

14. The kit of claim 12, wherein the kit further comprises a bearing cover.

15. The kit of claim 14, wherein the bearing seal cap is adapted to be disposed between the bearing cover and the unsealed bearing, and the unsealed bearing is adapted to be disposed between the bearing seal cap and the rotator.

16. A method of producing a regreasable idler pulley from a non-regreasable idler pulley, comprising the steps of:
    providing the non-regreasable idler pulley comprising a rotator and a sealed bearing;
    replacing the sealed bearing with an unsealed bearing;
    fixing a bearing seal cap having an orifice to the unsealed bearing, the bearing seal cap and the rotator forming a rotating body; and
    aligning the orifice with a grease fitting defined through the rotating body and rotatable therewith.

17. The method of claim 16, further comprising sealing the bearing seal cap against the bearing.

18. The method of claim 16, further comprising sealing the bearing seal cap against the shaft.

19. The method of claim 16, further comprising fixing a bearing cover against the bearing seal cap.

20. The method of claim 19, further comprising sealing the bearing cover against the bearing seal cap.

* * * * *